US009045079B2

(12) United States Patent
Boomgarden et al.

(10) Patent No.: US 9,045,079 B2
(45) Date of Patent: Jun. 2, 2015

(54) READING LIGHT UNIT AND SYSTEM OF A LIGHT CONTROL UNIT AND A READING LIGHT UNIT

(75) Inventors: Gunter Boomgarden, Scharbeutz (DE); Mark Niedostatek, Wenzendorf (DE); Rüdiger Meckes, Berkenthin (DE); Wolfgang Rittner, Ahrensbok (DE)

(73) Assignee: Zodiac Aerotechnics, Plaisir (FR)

( * ) Notice: Subject to any disclaimer, the term of this patent is extended or adjusted under 35 U.S.C. 154(b) by 0 days.

(21) Appl. No.: 13/546,005

(22) Filed: Jul. 11, 2012

(65) Prior Publication Data
US 2013/0027954 A1     Jan. 31, 2013

Related U.S. Application Data (60) Provisional application No. 61/506,209, filed on Jul. 11, 2011.

(30) Foreign Application Priority Data

Jul. 11, 2011   (EP) .................................... 11173429

(51) Int. Cl.
B60Q 3/02       (2006.01)
B60Q 3/00       (2006.01)
B64D 11/00      (2006.01)

(52) U.S. Cl.
CPC .............. B60Q 3/0253 (2013.01); B60Q 3/005 (2013.01); *B64D 2011/0053* (2013.01); B60Q 3/0259 (2013.01); B64D 11/00 (2013.01)

(58) Field of Classification Search
USPC .................. 362/516, 514, 802, 560, 50–512; 356/213–236; 250/205
See application file for complete search history.

(56) References Cited

U.S. PATENT DOCUMENTS

| 6,315,427 | B1* | 11/2001 | Simon .......................... 362/147 |
| 7,150,548 | B2* | 12/2006 | Kohlmeier-Beckmann et al. ............................ 362/471 |
| 7,211,968 | B2* | 5/2007 | Adamson et al. ............. 315/295 |
| 7,344,277 | B2* | 3/2008 | Anderson et al. ............. 362/276 |
| 7,641,370 | B2* | 1/2010 | Heine et al. ................... 362/471 |
| 2003/0174499 | A1 | 9/2003 | Bohlander |
| 2006/0006821 | A1* | 1/2006 | Singer et al. .................. 315/312 |
| 2007/0236926 | A1* | 10/2007 | Guard et al. .................. 362/228 |

(Continued)

FOREIGN PATENT DOCUMENTS

| DE | 102009037757 A1 | 2/2011 |
| WO | 2009101579 A1 | 8/2009 |

(Continued)

OTHER PUBLICATIONS

Extended European Search Report dated Nov. 24, 2011 in related Application No. 11173429.9.

*Primary Examiner* — Diane Lee
*Assistant Examiner* — Naomi M Wolford
(74) *Attorney, Agent, or Firm* — Kilpatrick Townsend & Stockton LLP; Dean W. Russell; Davidson G. Lucas (57) ABSTRACT

Described are reading light units for a passenger service unit in an overhead panel above a number of passenger seats, including a reading light having a light source for emitting light to a passenger seat, an automatic adjustment arrangement, a beam forming element for adjusting the light beam geometrical properties, and a light forming element for adjusting the light optical properties.

15 Claims, 2 Drawing Sheets

(56) References Cited

U.S. PATENT DOCUMENTS

2008/0310177 A1* 12/2008 Clark ............................ 362/471
2009/0096994 A1* 4/2009 Smits ............................ 353/30
2010/0061078 A1* 3/2010 Kim ............................... 362/84

FOREIGN PATENT DOCUMENTS

| WO | 2010097253 A1 | 9/2010 |
| WO | 2011082998 A1 | 7/2011 |

* cited by examiner

READING LIGHT UNIT AND SYSTEM OF A LIGHT CONTROL UNIT AND A READING LIGHT UNIT

CROSS-REFERENCE TO RELATED APPLICATION

This application claims the benefit of U.S. Provisional Application No. 61/506,209 filed on Jul. 11, 2011, and claims the benefit of European Patent Application No. 11173429.9 filed on Jul. 11, 2011, the contents of both of which are incorporated herein by reference.

BACKGROUND

The invention relates to a reading light unit for a passenger service unit in an overhead panel above a number of passenger seats. Further the invention relates to a reading light system of a light control unit and a reading light unit of the mentioned kind.

Passenger service units of the aforementioned type are known in the state of the art and are widely used in civil aircrafts. Generally a passenger service unit comprises a reading light, a passenger air supply device, oxygen masks, warning lights and the like appliances. In some aircrafts one passenger service unit is provided for each seat of a passenger and crew member. In other aircrafts one single passenger service unit is provided for a number of the seats, e.g. in particular for a row of seats. A row usually is aligned crosswise to an alley of seats; a row may have two, three, four, five, six or more seats depending on the size of the civil aircraft. Modern civil aircrafts cabins may have a capacity of several hundred seats for passengers.

A reading light unit for a aforementioned passenger service unit is known to be provided with a light source for emitting light to a passenger seat. Usually an adjusted light source is provided in a containment from the manufacturer and is incorporated into a passenger service unit during assembly thereof; thus adjustment of the light source is not admitted. Usually, as assembled, the emission of light from the light source is such that a light beam is directed to a proper spot or illumination plane near the passenger seat. A directional adjustment of the light source, however, may be convenient to vary depending on the situation of the passenger during the flight. The passenger might be in the situation to have a meal served or might be in the situation to read papers or might be in the situation to sleep. Already the above mentioned situations usually can demand for an adjusted reading light. Up to now a light source can be switched off or on manually. It is desirable to provide a more convenient adjustment of a light source.

DESCRIPTION

Accordingly, it is a major object of the present invention to provide a reading light unit for a passenger service unit which is adapted for an improved and/or easier adjustment. A further object of the invention is to provide a reading light unit which is capable of being adjusted with regard to a broader range of properties which is improved in relation to the possibilities outlined in the introduction. It is still a further object of the invention to provide a reading light unit which can be adjusted more easily by a passenger, in particular in a more convenient way. It is still another object of the invention to provide an improved reading light system of a light control and a reading light unit.

As relates the reading light unit the object is achieved by the reading light unit as mentioned in the introduction, wherein in accordance with the invention the reading light unit comprises:
a reading light having a light source for emitting light to a passenger seat,
an automatic adjustment arrangement, wherein it is further provided:
a beam forming element for adjusting the light beam geometrical properties, and light forming element for adjusting the light optical properties.

The invention recognized that it is desirable to adjust a reading light and keep the reading light nevertheless untouched in its containment; i.e. the reading light unit. Thus the inventive concept provides an automatic adjustment arrangement for the reading light. The invention recognized that it is generally advantageous to adjust a light beam geometrical properties. The invention advantageously provides a beam forming element which is able to adjust geometrical properties of a light beam. Thus a larger variety of geometrical properties of the light beam can be adjusted more easily and with higher accuracy. Also generally, the individual demands of a passenger with regard to light beam geometrical properties—in particular among others alone or in combination one or more of properties of a light beam direction, a light beam focus or a width of the light beam—can be adapted. E.g. a light source arranged in a mounting, an aperture frame of the light source can be used for automatic (i.e. non-manual) tilting of the light source in the mounting until a convenient direction is achieved. The invention recognized that in principle the passenger may achieve thereby a well defined adjustment of light beam geometrical properties to at least vary the position and size of a light spot in an illumination plane near the passenger seat which are also according to the demands of various situations during the flight.

Additionally the invention recognized that the illumination of the surroundings—thus also a passenger's situation—can be significantly improved by an automatic adjustment arrangement, which also comprises a light forming element for adjusting the light optical properties. In particular, light optical properties are meant to comprise those properties which relate to inherent properties of the light itself. In particular light optical properties relate to a wavelength of light or a temperature of a light spectrum or an intensity or brightness of light; thus the light optical properties mainly relate to those properties, which inherently are connected with the quality of the light emitted by the light source (like the spectrum and power of emitted light) rather than geometrical properties of the light beam (like size and direction of the light beam). By providing a light forming element in the reading light unit the invention advantageously achieves that a light optical property can be adapted to the optical properties of an object to be illuminated and/or an daytime or flight situation—thus, also here to the convenience of a passenger. Illumination of the surroundings or illumination of specific objects near the passenger seat is improved by using the inventive reading light unit.

Also the concept of the invention has the advantage that the adjustment arrangement can be adapted in a broader range and therefore a variety of properties can be adapted according to the individual demands of the passenger. It turned out that by providing an automatic adjustment arrangement it will be possible to automatically adjust the light beam geometrical properties and/or the light optical properties. Thus, in principle a passenger interaction is minimized or automated in a convenient way. Advantageously manual interactions and handling on the reading light unit at the passenger service unit by the passenger is reduced; thus efforts for adjusting the reading light are advantageously diminished or enabled in a convenient way.

Thus, by combining a beam forming element and a light forming element in the reading light unit the concept of the invention advantageously allows for a significantly improved illumination of a passengers nearest surroundings. The concept of the invention allows automated, in particular remote, and thus easy and accurate adjustment of the reading light with improved flexibility adapted to the passengers situation; especially e.g. when working, eating or sleeping during a flight. The light optical properties can be preferably adjusted independent from the light beam geometrical properties; thus the passenger is able to combine optimized light optical properties with optimized light beam geometrical properties automatically and easy by an automatic remote control unit.

As relates the system the object is achieved by a reading light system of a remote light control unit and a reading light unit of the invention. The reading light unit of the system is provided in a passenger service unit arranged in an overhead panel above a number of passenger seats. At least the remote control unit, has a man-machine-interface to generate a reading light adjustment signal for adjusting the light beam geometrical properties and/or the light optical properties. For this feature it is claimed independent protection independent from all other features of this disclosure. According to a further development the remote light control unit has a man-machine-interface to generate a reading light adjustment by means of a signal for adjusting the light beam geometrical properties and/or the light optical properties. The man-machine-interface is in particular a touch-pad or the like easy to handle input means.

These and further developed configurations of the invention are further outlined in the dependent claims. Thereby, the mentioned advantages of the proposed concept are even more improved. For each feature of the dependent claims it is claimed independent protection independent from all other features of this disclosure.

In a particular preferred development the adjustment arrangement is non-manually actuable by a remote reading light adjustment signal. For this feature it is claimed independent protection independent from all other features of this disclosure. Manual handling of a passenger on the reading light unit, like on an aperture frame or the like, advantageously becomes unnecessary. Alternatively or additionally a control unit can be provided by the passengers service unit or by a central cabin control unit for providing said light adjustment signal. E.g. light beam geometrical properties and/or light optical properties, in particular a combination of both, can be adjusted under control of a central control unit, e.g. a central control unit for a cabin or a control unit for a row of passenger seats, without any interaction of the passenger. A passenger may have a remote mobile control unit at hand for giving an adjustment signal or a remote control unit can be implemented—removable or non-removable—in the passenger seat. A man-machine-interface (MMI) can be provided in the passengers remote control unit. The MMI may react on gestures of the passenger. E.g. an MMI can be implemented as a touch pad or a touch screen or a track ball or a joystick or the like. The MMI can also be provided in a remote control unit separate from the passenger seat. Advantageously a mobile MMI can be handled by the passenger also when not sitting in the seat. The reading light system can be preferably developed accordingly with an improved remote and/or mobile light control unit.

In a particular preferred development the beam forming element is adapted to form the light beam by adjusting—among others—the focus and/or width of the light beam and/or the direction of the light beam. For this feature it is claimed independent protection independent from all other features of this disclosure. Advantageously, the beam forming element is an adaptable reflector in the light source. A reflector can be easily manufactured and actuated for adjustment. Furthermore, a reflector turns out to be an efficient beam forming element for adjusting focus, width and direction of the light beam.

In a particular preferred development the light forming element is adapted to form the light by adjusting a brightness of light automatically, this can significantly increase support of the passenger in a reading situation.

Preferably the light forming element, in particular a temperature and/or colour adaptable light forming element, is adapted to form the light by adjusting a white light temperature and/or a light colour of the light. In particular for this case the light forming element is adapted to a white light temperature adjustment and/or adjustment of a light colour of the light by means of a remote reading light adjustment signal dedicated to adjust the light optical properties.

In a particular preferred development the light forming element is adapted to form the light by adjusting a white light temperature. For this feature it is claimed independent protection independent from all other features of this disclosure. For instance by increasing the intensity of a light source and/or decreasing the temperature of a light spectrum, e.g. by providing a bright light with a rather cold white light spectrum, a paper can be illuminated much better because the light power reflected from the paper will be higher. On the contrary, a warm meal will appear more appetizing illuminated by a gradually dimmed light and/or warm light; thus slightly dimmed intensity of a light source and/or increased temperature of a light spectrum will be more advantageous in a situation when a meal is served. Also light optical properties can be adapted according to a simulated day or night time illumination during a long-haul flight. For instance daylight conditions depending on the passenger's situation might be preferred when leaving or approaching an airport during day time and depending on the flight situation. Light optical properties e.g. can be adapted to simulate a dawn or sunset situation on demand or automatically depending on a passengers input or a flight situation. A white light temperature can be selected in a range of 4500 K to 6000 K preferably to aim for a rather warm or rather cold or a more dawnlight or daylight or a more evening light or sunset light situation; all preferably depending on the circumstances of the flight and the passenger.

Particular preferred, light forming elements are selected from the group of elements comprising: a prism, an aperture, a colour filter, a combination of coloured light generators in the light source (like e.g. an RGB array or other combination of red green blue or other coloured LEDs), a temperature and/or colour adaptable reflector. For this feature it is claimed independent protection independent from all other features of this disclosure. Each of these elements can be used alone or in combination. Particularly preferred is a combination of a prism and an aperture. Whereas a prism is able to spectrally resolve a white light spectrum, a movable aperture can be used to move through the resolved spectrum and thereby select a certain colour of the resolved white light spectrum; thus only the selected colour will be emitted to the passenger seat.

In a particular preferred development the reading light unit further comprises a heat and/or temperature detector for sensing and evaluating a heat source in an illumination plane near the passenger seat. For this feature it is claimed independent protection independent from all other features of this disclosure. The heat and/or temperature detector advantageously is possible to automatically detect whether the passenger actually has been served a meal or other warm or cold food items like a tea or coffee or soft drink. In particular the heat and/or temperature detector is an infrared sensor or a bolometer or the like heat sensitive sensor for detecting heat source on basis of the heat sources infrared emission. Preferably the heat and/or temperature detector is adapted for meal detection; thus the detector indicates to the reading light unit, e.g. by a reading light adjustment signal, that a meal is served and preferably also a colour and/or temperature is to be adjusted by the light forming element. Preferable a "meal served"—status signalizing overrules other status signalizing because priority is given to a convenient recognizing of the meal. Preferably the priority may be changed preselected or by the passenger.

Thus, advantageously the heat and/or temperature detector provides a trigger signal to the reading light automatic adjustment arrangement to optimize the colour and/or white light temperature of the light emitted from a light source. Preferably also a colour and/or white light temperature information may be provided in relation to the illumination plane.

For these features it is claimed independent protection independent from all other features of this disclosure.

In a particular preferred development a light colour wavelength and/or white light temperature is increased with increasing temperature of an illumination plane near the passenger seat. For this feature it is claimed independent protection independent from all other features of this disclosure. Advantageously a served meal is illuminated by a warm light whereas a plane paper for reading is illuminated by a rather cold light. In both situations the light optical properties are optimized with regard to the illuminated object near the passenger.

The aforementioned developments are advantageously applicable independent of the light source in use. The light source may comprise a light bulb or an LED. Furthermore, the light source may comprise any other possible light source like a halogen lamp or an OLED.

In a particular advantageous further developed variant of the inventive concept the light source is a laser source. In particular the laser source is adapted to provide a size adaptable laser projection of a laser light pattern to the illumination plane near the passenger seat. For this feature it is claimed independent protection independent from all other features of this disclosure. For instance a laser projector can have a scanning laser beam to generate the size adaptable laser projection. The preferred variant has the advantage that a laser source practically has no stray light; thus even upon bright and cold illumination of an illumination plane at a first passenger seat a neighbouring second passenger seat is rarely influenced by stray light; thus an adjacent passenger is left undisturbed even in apparently conflicting situations like e.g. a sleeping first passenger and a neighbouring reading second passenger.

The developed concept of the variant is not restricted to a patterned projection of laser light. Instead for instance for reading or simple illumination of a meal the laser light projection may be a plane white light field projection without a pattern or structure, i.e. just a white or coloured field of preferred white light temperature and/or colour. Still also the laser light projection can be patterned inhomogeneous or can be structured and/or coloured; for instance provided as a light picture or light sign. The laser light pattern may be provided as a still-frame or moving-frame. Also additionally or alternatively the laser light pattern can be part of a movie or other multimedia stream.

A particular preferred development of the variant provides a reading light unit comprising a light detector for sensing and evaluating reflected laser light, wherein the light detector provides size information of an illuminated plane at the passenger seat to a projector. For this feature it is claimed independent protection independent from all other features of this disclosure. Advantageously the size of the projection can be optimized in relation to the illumination plane. The development has the advantage that the reading light unit can automatically adapt the size or spot of the projection to a size or location of the object to be illuminated in the illumination plane; preferably additionally also according to the demands of the passenger.

Preferably the light source is an individual light source of a reading light assigned to a single passenger seat wherein the light source is integrally provided with the adjustment arrangement. For this feature it is claimed independent protection independent from all other features of this disclosure. Thus for each passenger seat an individual reading light unit is provided and adjustable with regard to light beam geometrical properties and light optical properties.

In a variant of this development an additional or alternative single light source can be provided as a shared light source. The shared light source can be arranged in the passenger service unit above a number of passenger seats for providing a number of light beams at least for the number of passenger seats. For this feature it is claimed independent protection independent from all other features of this disclosure. The number of passenger seats for instance can be passenger seats of a row or the like. A single light beam of the number of light beams is adjustable to a single passenger seat from a single reading light outlet; said single reading light outlet has an outlet aperture and the adjustment arrangement for the single light beam only (i.e. without an extra light source). In other words preferably only one light source is sufficient for illuminating at least two passenger seats, in particular a row of passenger seats. This diminishes manufacturing cost and first-installation and maintenance costs and efforts for reading light units.

Preferably a shared light beam of a shared light source and/or the number of light beams drawn off the shared light source are transmitted via a light transmission line in the passenger service unit. The light transmission line preferably comprises one or more optical transmission elements and optical adjustment elements. For these features it is claimed independent protection independent from all other features of this disclosure. The optical transmission and optical adjustment elements serve to transmit the light beam from the light source to an open aperture in the reading light unit.

Advantageously it is obsolete to provide an individual light source for each passenger seat; this reduces the total number of light sources in the cabin of the aircraft significantly. Advantageously electrical load, heat production and equipment- and maintenance-efforts for all light sources is significantly reduced. The optical transmission element for instance can be a prism, a mirror, a beamsplitter or a light fibre. The optical adjustment element can be an electroluminescent element or surface or filter or the like. The electroluminescent element or surface can be used to adapt a temperature of a white light spectrum or a colour of the light beam from the light source. The electroluminescent element or surface can also be used to adjust the brightness or intensity of the light beam.

In particular the shared light source arranged in the passenger service unit above a number of passenger seats provides—among the number of light beams—a specific light beam for illumination of a sign or for providing a light indication; the specific light beam is preferably, but not obligatory, adjusted away from the passenger seat. For this feature it is claimed independent protection independent from all other features of this disclosure. Advantageously, depending on the flight situation, different light indications like flight relevant warnings or information or other information can be provided at the cabin wall or other projection surface; for instance a panel which is visible by the passenger from its seat.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality. The wording, "a number of" items, comprises also the number one, i.e. a single item, and further numbers like two, three, four and so forth.

Figure 1:
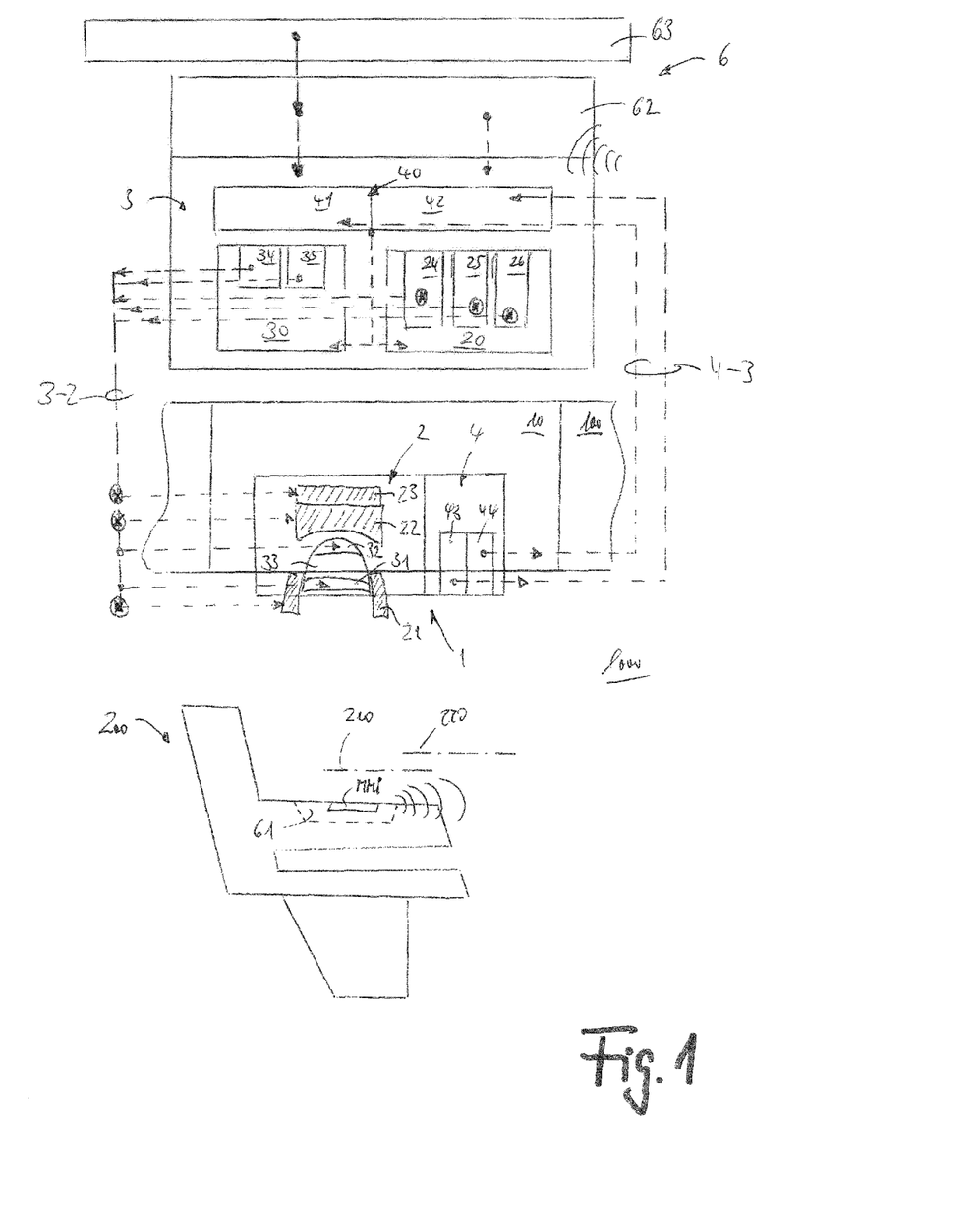
FIG. 1: a first embodiment of a reading light unit for a passenger unit arranged in an overhead panel above a single passenger seat, wherein the light source is an individual light source of a reading light assigned to the single passenger seat.

FIG. 1 shows in detail a reading light unit 1 in a passenger service unit 10 which as such is arranged in an overhead panel 100 above a number of passenger seats 200. The reading light unit 1 has a reading light 2, a detector 4 and an automatic adjustment arrangement 3—shown schematically—wherein the automatic adjustment arrangement 3 is control-connected to the reading light 2 as indicated by dashed control line connections 3-2 in FIG. 1 and the detector 4 is sensing signal-connected to the automatic adjustment arrangement 3 as indicated by dashed sensing signal line connections 4-3 in FIG. 1.

The automatic adjustment arrangement 3 and the reading light unit 1 provide a beam forming unit 20, a light forming unit 30 and a detector unit 40.

Further a reading light system 1000 is formed of a control 6 and a reading light unit 1 as shown in FIG. 1. The control 6 here comprises a remote light control unit 61, a reading light or passenger service control 62 and a central cabin control unit 63; each of the units of the control 6 are adapted to control the automatic adjustment arrangement 3. In particular the remote light control unit 61 is capable to communicate wireless with the automatic adjustment arrangement 3.

In detail the reading light 2 of the present embodiment has an aperture frame 21 and a reflector 22 and other symbolically shown beam forming elements 23 which are control-connected to a beam forming unit 20 of the automatic adjustment arrangement 3.

Further the reading light 2 has a light source colour filter 31 and a light source 32 in form of a red-green-blue array of LED's and other symbolically shown light forming elements 33 which are control-connected to the light forming unit 30 of the automatic adjustment arrangement 3.

The light forming unit 30 is adapted to adjust via the colour filter 31 a white light temperature of the light source 32. Also the light forming unit 30 is adapted to adjust via the LED array of the light source 32 a colour of the light emitted by the light source 32. For this, the light forming unit 30 further comprises a white light temperature control-and actuation-module 34 and a light colour control- and actuation-module 35. An arrangement for actuation may comprise electric motors or other drive devices for actuating the filter 31 and/or an arrangement for control of e.g. the LED array of the light source 32 may comprise a current control or the like.

The beam forming unit 20 has a beam focus control-and actuation-module 24 and a beam width control- and actuation-module 25 and a beam direction control- and actuation-module 26.

The detector unit 40 of the automatic adjustment arrangement 3 in this embodiment has an infrared detector module 41 and a stray light detector module 42. The infrared detector module 41 and the stray light detector module 42 are sensing-signal-connected to an infrared sensor 43 capable of sensing heat for instance by a Bolometer or infrared sensor 43 and a stray light sensor 44, for instance a photodiode or the like, respectively.

In the present embodiment the automatic adjustment unit 3 can be controlled by a remote control unit 61 of the passenger having an MMI in form of a touch pad. Thereby here the reading light 1 can be controlled via the touchpad in the remote control unit 61. Thereby an adjustable reading light 1 is provided which can be controlled via a MMI integrated into the passenger seat 200. When the remote control unit 61 is removed from the passenger seat 200 or generally is provided separately, using commonly known gestures as used on computers or smartphones today, also the reading light 1 can be adjusted also form a passenger when not sitting in the passenger seat 200. Thus, the passenger is able to adapt to his convenience for instance the light optical properties for the reading light 1 by tuning the white light temperature control- and actuation-module 34. By way of the light forming unit 40, the white light temperature control- and actuation-module 34 is able to actuate the colour filter 31 such that rather cold light is leaving the light source 1 for illumination of the illumination plane 210 where e.g. a paper or the like reading material is placed near the passenger seat 200.

Also by way of a central aircraft parent control unit 63 or a reading light or passenger service control unit 62, the light forming unit 30 or beam forming unit 20 can be controlled such that day light conditions, sunset or sundown conditions; the latter e.g. are adapted by admixing a middle temperature white light with a, for instance, red or green component of the light by means of the colour control- and actuation-module 35 tuning the LED array of the light source 32. Thus a reading light 1 with adjustable emission of light with a certain colour and/or temperature of white light spectrum is provided. As the optimal colour and/or temperature for reading is different than for illuminating food the reading light 1 can be adapted by external input from the control 6 or detection through detector 4; e.g. as by change of current to the LED or addition/subtraction of additional supplementary LED light with red and/or yellow light patterns.

Also, when a meal is served in another illumination plane 220 the infrared detector module 41 by way of the infrared sensor 43 will be able to sense the heat of the meal. By signalling via the sensing-signal connection 4-3 an infrared detector module 41 will be triggered to actuate via the white light temperature control-and actuation-module 34 the filter 31 such that a warm temperature white light is provided for illumination of the meal. Also, other optical light forming elements 33 like an electro luminescent element or the like can be provided. Thus a reading light unit 2 with meal detection is provided. As the optimal colour and/or white light spectrum temperature for reading is different than for illuminating food the reading light will be adjusted by the input of the infrared sensor 43; the infrared sensor 43 can be formed as a simple temperature sensor, but preferably is an infrared sensor, which provides a signal to the sensing-signal connection 4-3; thereby automatically changing the colour and/or temperature of the light emitted by the reading light 1 to a meal compatible pattern.

Also, by way of the remote control unit 61 a passenger will be able to actuate a beam forming unit 20. For instance by way of the beam focus control- and actuation-module 24 and/or the beam width control- and actuation-module 25 and/or the beam direction control-and actuation-module 26 the passenger may act on the reflector 22 and/or the aperture frame 21 or the another beam forming element 23 to automatically adjust the focus and/or width and/or direction of the light beam. Thus the reading light 1 is provided to adjust a position, focus, or other geometrical beam properties. Generally in this embodiment the reading light 1—through the integration of mechanical actuation—is capable of being moved through the means of an input signal given by the user/passenger. The movement may be a change in direction of the beam, changing the focus of the beam through the adjustable reflector 22, and/or the size of the beam again through an adjustable reflector 22.

For identical or equivalent items or items of identical or equivalent function in the following the same reference marks are used. For corresponding features thus it is referred to the above description. In the following, in particular the differences between the embodiment of a reading light system 1000 of FIG. 1 and a reading light system 2000 of FIG. 2 are described.

In a reading light system 2000—instead of providing a light source 32 in every reading light 1 of a reading light system 1000—a single light source 32 is provided as a shared light source arranged in the passenger service unit 10 above number of three passenger seats 201, 202, 203 in a row of passenger seats. Each one of the passenger seats has a remote control unit 61.1, 61.2, 61.3. The single light beam emitted from the single reading light 1 is split by beam splitters 11, 12, 13 into light beams 1.1, 1.2, 1.3. Thus here three reading light substitutes are realized with a single light source of a reading light 1 and three reading light outlets. Instead of providing a light source in every reading light substitute, this embodiment uses a single light source in a reading light 1 of a reading light unit 2 on the passenger service unit 10; the single light beam can also be transmitted via other optical elements—additional to or alternatively to the beamsplitters 11, 12, 13—like prisms and/or mirrors to the respective reading light outlet positions. Control of the light path, i.e. control and actuation of the optical elements can be provided mechanically and/or by electroluminiscent surfaces not shown in FIG. 2. In addition the light source of the reading light 1 may be used for the illumination on signs and indications as well.

Figure 2:
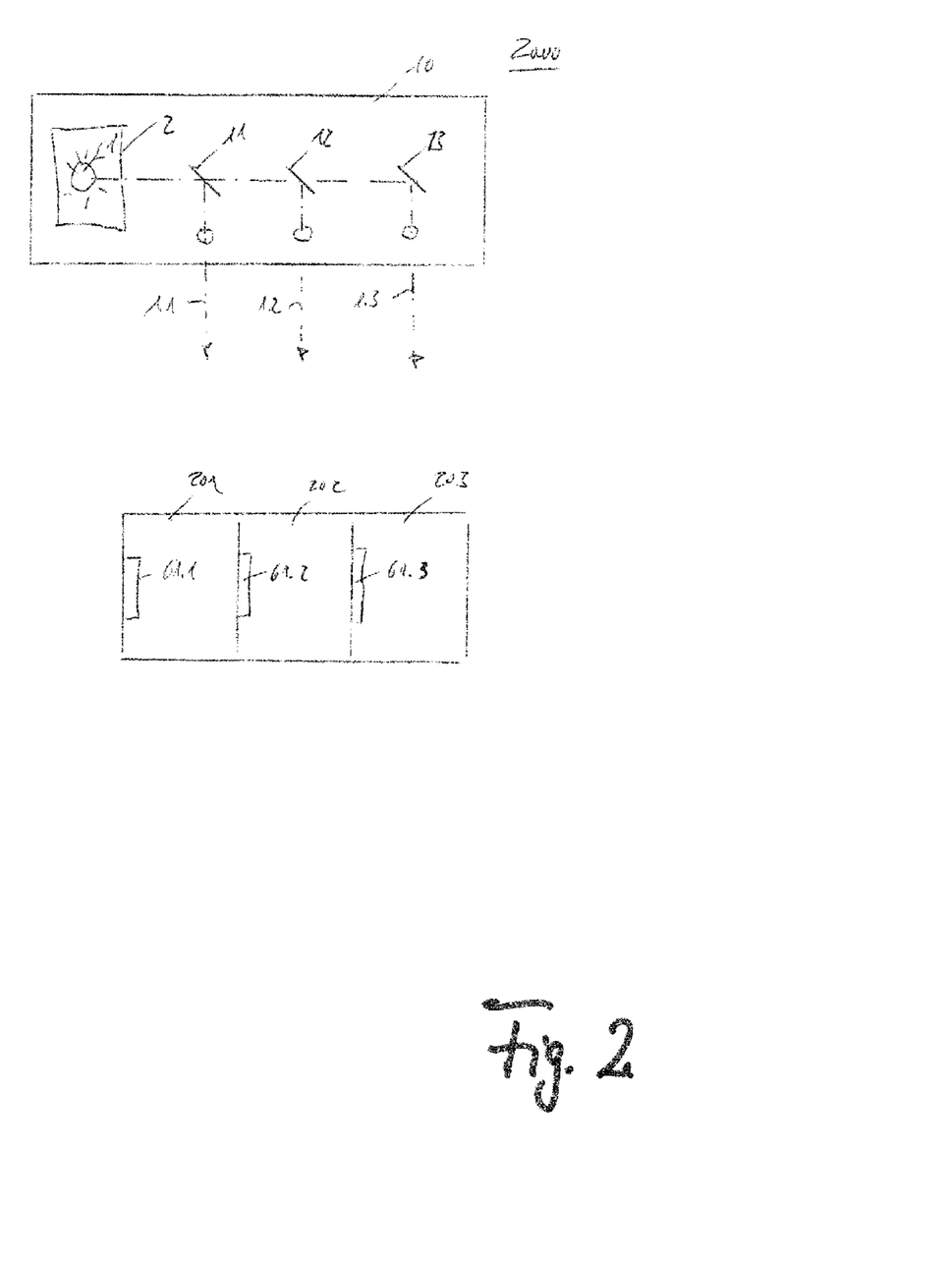
FIG. 2: a second embodiment a reading light unit for a passenger service unit arranged in an overhead panel above a number of passenger seats, wherein the light source is a single light source as a shared light source arranged in the passenger service unit above a number of passenger seats.

In a variant of the embodiment of FIG. 1 or FIG. 2 the reading light 1 is generated by a light source 32 in form of a laser. Small laser projectors are becoming more common for commercial applications. In this variant a laser projector is used to provide a white light pattern on a given illumination plane 210 or 220 which is freely adaptable or can be preset with patterns to be selected by the passenger. This may be combined with a laser detection—e.g. using a stray light sensor 44 mentioned above—of an object surface like a book surface provided in the illumination planes 210, 220. For instance the size of the projection can be adapted to the size of a paper as detected by the stray light in the stray light sensor 44. For instance the spot of the projection can be amended from a back seat bearing area of illumination plane 210 to a front seat tablet area of a illumination plane 220 when a meal is served on the front seat tablet; preferably additional the size of the projection and temperature of white light spectrum can be adapted from paramaters adapted to a white paper to paramaters adapted to a meal. The information detected by the stray light in the sensor 44 and the infrared radiation in the infrared sensor 43 of the detector 4 can be used for this purpose in combination. Thereby an optimized illumination area in the illumination planes 210, 220 can be provided. In addition the laser projector may be used to project additional information in pictorial or movie or multimedia form; the additional information may contain an advertisement, entertainment, but also safety information like signs.

The invention claimed is:

1. Reading light unit for a passenger service unit in an overhead panel above a number of passenger seats, comprising:
   a reading light having a light source for emitting light to a passenger seat, wherein the light source is capable of emitting a white light with a white light spectrum of a white light temperature;
   an automatic adjustment arrangement control-connected to the reading light and comprising:
      (a) a beam forming element for adjusting geometrical properties of a light beam from the light source, and
      (b) a light forming element for adjusting optical properties of the light, wherein the light forming element is temperature adaptable and comprises a white light temperature control and actuation module configured to form the light emitted by the light source by adjusting the white light temperature of the light;
      (c) a heat or temperature detector for sensing and evaluating a heat source in an illumination plane near the passenger seat, wherein the heat or temperature detector provides white light temperature information to the reading light adjustment arrangement to optimize the white light temperature of the light beam from the light source in relation to an object to be illuminated in the illumination plane; and
      (d) a light detector for sensing and evaluating a reflected light, wherein the light detector provides size-information of the illumination plane at the passenger seat to the light source to optimize the size of a projection of the light source in relation to the object to be illuminated in the illumination plane.

2. Reading light unit of claim 1 wherein the adjustment arrangement is non-manually actuable by a remote reading light adjustment signal given by a control unit or a passenger remote control unit.

3. Reading light unit of claim 1 wherein the beam forming element is an adaptable reflector adapted to form the light beam by adjusting a focus or width or direction of the light beam.

4. Reading light unit of claim 1 wherein the light forming element is a color adaptable light forming element adapted to form the light by adjusting a light color of the light.

5. Reading light unit of claim 1 wherein the light forming element is selected from the group of elements comprising: a prism, a color filter, a combination of colored light generators in the light source, LEDs, or a temperature or color adaptable reflector.

6. Reading light unit of claim 1 wherein the heat or temperature detector provides color temperature information to the reading light adjustment arrangement to optimize the color temperature of the light beam from the light source in relation to the illumination plane.

7. Reading light unit of claim 1 wherein a light color wavelength or white light temperature is increased with increasing temperature of the illumination plane near the passenger seat.

8. Reading light unit of claim 1 wherein the light source is a laser source in the form of a laser projector having a scanning laser beam, wherein the laser source is adapted to adjust a size-adaptable laser projection of a laser light pattern to the illumination plane near the passenger seat.

9. Reading light unit of claim 1 wherein the light source is an individual light source of a reading light assigned to a single passenger seat, wherein the light source is integrally provided with the adjustment arrangement.

10. Reading light unit of claim 1 wherein the light source is a single light source as a shared light source arranged in the passenger service unit above a number of passenger seats for providing a number of light beams at least for the number of passenger seats, wherein a single light beam of the number of light beams is adjustable to a single passenger seat from a single reading light, the single reading light having an outlet aperture and the adjustment arrangement for the single light beam.

11. Reading light unit of claim 10 wherein a shared light beam of the shared light source or the number of light beams drawn off the shared light source are transmitted via a light transmission line in the passenger service unit wherein the light transmission line comprises one or more optical transmission elements and optical adjustment elements selected from the group of optical elements comprising: a prism, a mirror, a light fiber, an electroluminescent element or an electroluminescent surface.

12. Reading light unit of claim 10 wherein the shared light source arranged in the passenger service unit above a number of passenger seats provides in the number of light beams a specific light beam for illumination of a sign or for providing a light indication.

13. Reading light system comprising a remote light control unit and a reading light unit in an overhead panel above a number of passenger seats, wherein the remote light control unit has a man-machine- interface to generate a reading light adjustment signal for adjusting light beam geometrical properties and light optical properties and the reading light unit comprises:
  (a) a reading light having a light source for emitting light to a passenger seat, wherein the light source is capable of emitting a white light with a white light spectrum of a white light temperature; and
  (b) an automatic adjustment arrangement control-connected to the reading light and comprising
    (i) a beam forming element for adjusting the light beam geometrical properties and
    (ii) a light forming element for adjusting the light optical properties, and wherein the light forming element is temperature adaptable and comprises a white light temperature control and actuation module configured to form the light emitted by the light source by adjusting the white light temperature of the light;
  (c) a heat or temperature detector for sensing and evaluating a heat source in an illumination plane near the passenger seat, wherein the heat or temperature detector provides white light temperature information to the reading light adjustment arrangement to optimize the white light temperature of the light beam from the light source in relation to an object to be illuminated in the illumination plane; and
  (d) a light detector for sensing and evaluating a reflected light, wherein the light detector provides size-information of the illumination plane at the passenger seat to the light source to optimize the size of a projection of the light source in relation to the object to be illuminated in the illumination plane.

14. Reading light unit of claim 1 wherein the heat or temperature detector is configured to sense the heat of a meal in the illumination plane near the passenger seat.

15. Reading light unit of claim 1 wherein the light forming element is a combination of a prism and an aperture.

* * * * *

UNITED STATES PATENT AND TRADEMARK OFFICE
CERTIFICATE OF CORRECTION

| | | |
|---|---|---|
| PATENT NO. | : 9,045,079 B2 | Page 1 of 1 |
| APPLICATION NO. | : 13/546005 | |
| DATED | : June 2, 2015 | |
| INVENTOR(S) | : Gunter Boomgarden et al. | |

It is certified that error appears in the above-identified patent and that said Letters Patent is hereby corrected as shown below:

On the title page

In the Foreign Application Priority Data section, Item (30), the priority number is missing a number. Please correct the priority number to read:

--11173429.9--

Signed and Sealed this
First Day of March, 2016

Michelle K. Lee
*Director of the United States Patent and Trademark Office*